United States Patent Office 3,033,813
Patented May 8, 1962

3,033,813
MIXTURES OF ACRYLONITRILE POLYMERS WITH POLYPYRROLIDONE AND FIBER MADE FROM SAME
Jesse Werner, Holliswood, N.Y., assignor to General Aniline & Film Corporation, New York, N.Y., a corporation of Delaware
No Drawing. Filed June 22, 1959, Ser. No. 821,687
19 Claims. (Cl. 260—45.5)

This invention relates to new resinous compositions of matter comprising mixtures of acrylonitrile containing polymers and polypyrrolidone.

The acrylic resins, and specifically polyacrylonitrile resins, are admirably suited for the production of fibers which can be spun and employed as a textile fiber. Such fibers have outstanding physical properties such as high sticking temperatures, excellent strength, and superior resistance to shrinkage at elevated temperatures. In the last few years, textiles composed primarily of such fibers, or containing such fibers, have assumed an outstanding prominance in the field due to the aforementioned outstanding properties, in addition to many other desirable attributes which one looks for in a textile material. Great inroads in the wool market have been made by this fiber, either as the homopolymer, as the copolymer, or as a modified homopolymer. There have been vast strides towards improving certain deficiencies of the polymers, and particularly in improving the dyeability and hand thereof. There are characteristics, nevertheless, of these fibers which still require improvement. Among these are improved water absorption characteristics, and particularly antistatic properties. In addition, there is a continuing search for better dyeability since even today many dyes are not effective with the acrylic fibers, and many others require involved and expensive dyeing procedures. There is still room for improvement towards a better hand for such fabric materials.

It has been discovered that by combining polyacrylonitrile, either as a homopolymer or as a major constituent of a copolymer or graft copolymer, with polypyrrolidone, the aforementioned advantages of the acrylic fibers are not deleteriously affected, and at the same time vast improvements of dyeability and other properties are forthcoming.

It is therefore an object of this invention to provide new resin compositions comprising mixtures of acrylonitrile containing polymeric materials with polypyrrolidone.

It is another object of this invention to provide resin compositions providing mixtures of homopolymeric acrylonitrile with polypyrrolidone.

It is still another object of this invention to provide resin compositions comprising mixtures of copolymers including as a major constituent acrylonitrile with polypyrrolidone.

It is a still further object of this invention to provide resin compositions comprising mixtures of graft copolymers containing a major amount of acrylonitrile with polypyrrolidone.

Another object of this invention is to provide homogeneous solutions of the aforementioned mixtures.

Still another object of this invention is to provide fibers from mixtures of acrylonitrile containing polymeric materials admixed with polypyrrolidone.

Still another object of the present invention is to provide methods for the preparation of the composition and fibers of this invention.

Other objects will appear hereinafter as the description proceeds.

The resin compositions of this invention comprise mixtures of polypyrrolidone and an acrylonitrile containing polymeric resinous material, the said mixture containing at least 50% based on the weight of the total mixture of acrylonitrile component. Thus, when employing mixtures of homopolymeric acrylonitrile and polypyrrolidone, the content of the homopolymer should be at least 50% of the total composition. Where copolymers and graft copolymers containing acrylonitrile are used, the latter should be present in amounts of at least about 60%, and where this minimum is employed, then in order to have present in the final polypyrrolidone mixture at least 50% acrylonitrile component, it is necessary to employ about 83% of the copolymer. Where copolymers and graft copolymers containing more than 60% acrylonitrile component are used, correspondingly less copolymer or graft copolymer may be employed in admixture with the polypyrrolidone in order to achieve the minimum 50% acrylonitrile content. The copolymers of acrylonitrile which may be employed in the compositions of the present invention include any of the known copolymers and terpolymers of acrylonitrile with other polymerizable ethylenically unsaturated compounds such as vinyl chloride, vinyl acetate, acrylic acid, methyl acrylate, ethyl acrylate, acrylamide, methacrylic acid, methyl methacrylate, ethyl methacrylate, methacrylamide, vinyl pyridine, styrene, vinyl alcohol, methacrylonitrile, maleate ester, e.g., diethyl maleate, isopyropenyl acetate fumaronitrile, vinylidine chloride, vinyl methyl ethers, e.g., vinyl ethyl ether, and other similar polymerizable ethylenically unsaturated compounds.

Polypyrrolidone is a product derived from the polymerization of $\alpha$-pyrrolidone. Pyrrolidone, which is gama-butyrolactam, is capable of undergoing polymerization to yield a superpolyamide. Such polymerization procedures are described in U.S. Patent 2,638,463, and today polypyrrolidone is a well known polymeric product.

The resinous compositions contemplated in the present invention may be prepared by any one of several methods. Thus, the polymeric components can be mixed together in the solid state in a suitable mixer such as a ball mill or the like. Another method which can be used and which is preferred involves the dissolution in one or more common solvents, organic or inorganic, of the resinous components of the mixture. Where it is preferred to employ melt spinning technique for the formation of fibers, it is economically advantageous merely to blend the polymeric components in the solid state. Where wet or dry spinning techniques are employed, then of course homogeneous systems in a suitable solvent or solvent mixture must be used. Among suitable organic solvents which may be employed are formic acid, glycols, pyrrolidone, methyl pyrrolidone, phenols such as meta-cresol, gama-butyrolactone, and others. Inorganic solvents include aqueous solutions of numerous salts and among these, concentrated zinc chloride solutions are preferred. In wet and dry spinning procedures, it is desirable to employ concentrations of the resinous mixtures of this invention ranging from about 5 to about 25% by weight based on the total weight of the solutions. Employing wet spinning procedures, a suitable coagulating bath is required, and it is preferred with the present compositions to employ dilute hydrochloric acid solutions, and preferably a 1% aqueous hydrochloric acid solution as the coagulating solution. Where dry spinning procedures are preferred, the usual techniques of removing the solvent may be resorted to, such as countercurrent flow of hot air or other suitable inert gases or crosscurrent flow of hot gases.

The following examples will serve to illustrate the present invention without being deemed limitative thereof.

Parts in these examples are by weight unless otherwise indicated.

Example 1

To 100 g. of a 50% aqueous zinc chloride solution there are added 5 g. of homopolymeric acrylonitrile and 1 g. of polypyrrolidone (relative viscosity 4.0). A homogeneous solution results. This mixture is then extruded at a temperature of 80° C. through a spinnerette having six holes each with a diameter of 0.12 mm. into an aqueous hydrochloric acid bath, 1% acid concentration. The continuous filaments are then washed thoroughly and dried, and thereafter wound and twisted to yield a 30 filament yarn. The yarn is then drawn to six times its original length in the usual manner. The resultant yarn has a denier of 160 and a dry denacity of 3.0 g. per denier.

Example 2

1 g. of the yarn of Example 1 is dyed in a dyebath containing 150 mg. of Genacryl Pink 3G, a cationic basic type dye (Color Index, second edition, Basic Red 14), in 400 mls. of water at the boil for 2 hrs. Excellent exhaust and levelness of dyeing is obtained. The dyed yarn is then given the standard AATCC Wash Test III, and substantially no color is lost, the wash water indicating outstanding color retention of the dyestuff by the fibers.

Example 3

A composition comprising the following components is prepared:

(a) 10 parts of a 5% polypyrrolidone (relative viscosity 3.66) in 50% aqueous zinc chloride solution, and (b) 90 parts of 5% polyacrylonitrile (specific viscosity 3.84) in 50% zinc chloride solution.

The resulting compatible composition is then extruded through a 10 ml. 100 hole spinnerette into a 1% aqueous hydrochloric acid coagulating bath. The resulting tow is then thoroughly washed to remove all salts and then stretched to ten times its original length, employing moist steam, and finally dried for 15 min. at 120° C.

Example 4

The filaments produced in Example 3 are dyed in the same manner employing the same dyebath composition as used in Example 2. Similar results are forthcoming.

Example 5

The products of Examples 1 and 3 are dyed similarly as in Examples 2 and 4 except that the dyestuff employed is Alizarin Cyanine Green GHN Concentrate (Color Index, second edition, Acid Green 25). Again, outstanding exhaust and levelness of dyeing is obtained with the color retention characteristics outstanding in the aforementioned wash test.

Example 6

A homopolymeric acrylic fiber is prepared in the manner described above from a solution of polyacrylonitrile (specific viscosity 3.84) in 50% zinc chloride water solution. Dyeings on this fiber in the manner set forth in Examples 2 and 4 result in a very poorly dyed product. The dyeings are weak with poor exhaust from the dyebath, and the color retention is considerably weaker, also.

Example 7

Example 1 is repeated except that 9.9 g. of polyacrylonitrile (homopolymer) is admixed with 0.1 g. of polypyrrolidone, thereby yielding in the final mixture a polypyrrolidone content of 1% based on the total weight of resins and a polyacrylonitrile content of 99%. Even with this low content of polypyrrolidone, outstanding dyeings and dye retention characteristcis are exhibited by the spun fibers.

Example 8

Example 1 is again repeated except that equal parts of polyacrylonitrile and polypyrrolidone are employed. Again, the dyeings are far superior to those obtained on the homopolymer itself in the absence of the polypyrrolidone additive.

Example 9

Example 1 is again repeated except that in lieu of the homopolymer, a copolymer of acrylonitrile and vinyl pyridine is used containing 5% of the latter in the copolymer.

Example 10

Example 1 is again repeated except that instead of the homopolymer of acrylonitrile, there is used a copolymer of 90% acrylonitrile and 10% methacrylamide.

Example 11

Example 1 is against repeated except that instead of the homopolymer of acrylonitrile, there is used a copolymer of 88% acryonitrile and 12% N-methylmethacrylamide.

Example 12

Example 1 is again repeated except that instead of the homopolymer of acrylonitrile, there is used a copolymer of 92% acrylonitrile and 8% ethyl vinyl ether.

Example 13

Example 1 is again repeated except that instead of the homopolymer of acrylonitrile, there is used a copolymer of 85% acryonitrile and 15% styrene.

Example 14

Example 3 is again repeated except that instead of the 9 parts of the homopolymer, there is used a corresponding amount of a copolymer of 60% acrylonitrile and 40% methacrylonitrile.

Example 15

Example 3 is again repeated except that instead of the 9 parts of the homopolymer, there is used a corresponding amount of the graft copolymer containing 70% acrylonitrile and combined polyvinyl alcohol of 30%.

Example 16

Examples 1 and 3 are again repeated except that in each instance, in lieu of the homopolymer, there is employed an equal weight of a copolymer of acrylonitrile containing 10% vinyl acetate.

Example 17

Examples 1 and 3 are again repeated except that in each instance, in lieu of the homopolymer, there is employed an equal weight of a copolymer of acrylonitrile containing 6% methyl acrylate.

Example 18

Examples 1 and 3 are again repeated except that in each instance, in lieu of the homopolymer, there is employed an equal weight of a copolymer of acrylonitrile containing 10% methylmethacrylate.

While the mixed resin compositions of this invention as exemplified above have been described particularly for use as textile fibers and for fiber forming purposes, these mixtures may also be used in the form of sheets containing suitable plasticizers, dyes, fillers and the like. Furthermore, the said compositions may be used as coating compositions on various surfaces such as wood, glass, metals, and other resin surfaces. Additionally, molded products of various shapes and forms may be prepared from these mixed resin compositions by the usual molding techniques. All of the products comprising the mixtures of this invention are characterized by outstanding resistance to static accumulation, excellent resistance to heat, and superior dimensional stability when exposed to varying conditions of temperature and humidity.

Other variations in and modifications of the described processes which will be obvious to those skilled in the art can be made in this invention without departing from the scope or spirit thereof.

I claim:
1. A resinous composition comprising a mixture of from 50 to 99 parts by weight of an acrylonitrile polymer selected from the group consisting of homopolymeric acrylonitrile and copolymers, interpolymers, terpolymers and graft copolymers containing at least 60% by weight of acrylonitrile and the remainder another polymerizable ethylenically unsaturated monomer, and from 1 to 50 parts by weight of polypyrrolidone, the acrylonitrile content of the mixture being no less than 50% by weight.
2. A resinous composition comprising a mixture of from 50 to 99 parts by weight of polyacrylonitrile and from 1 to 50 parts by weight of polypyrrolidone, the total parts of the said ingredients being 100.
3. A resinous composition of matter comprising a mixture of 90 parts by weight of homopolymeric acrylonitrile and 10 parts by weight of polypyrrolidone.
4. A resinous composition of matter comprising a mixture of about 84% homopolymeric acrylonitrile and about 16% polypyrrolidone.
5. A resinous composition of matter comprising a mixture of about 99% homopolymeric acrylonitrile and about 1% polypyrrolidone.
6. A resinous composition comprising a mixture of from 50 to 99 parts by weight of an acrylonitrile containing polymeric material consisting of at least 60% by weight of acrylonitrile and the remainder vinyl acetate, and from 1 to 50 parts by weight of polypyrrolidone.
7. A resinous composition of claim 6 wherein the vinyl acetate content of the copolymer is 10%.
8. A resinous composition comprising a mixture of from 50 to 99 parts by weight of an acrylonitrile containing polymeric material consisting of at least 60% by weight of acrylonitrile and the remainder methyl acrylate, and from 1 to 50 parts by weight of polypyrrolidone.
9. A resinous composition of claim 8 wherein the methyl acrylate content of the copolymer is 6%.
10. A resinous composition comprising a mixture of from 50 to 99 parts by weight of an acrylonitrile containing polymeric material consisting of at least 60% by weight of acrylonitrile and the remainder methyl methacrylate, and from 1 to 50 parts by weight of polypyrrolidone.
11. A resinous composition of claim 10 wherein the methyl methacrylate content of the copolymer is 10%.
12. A synthetic fiber comprising from 50 to 99 parts by weight of an acrylonitrile containing polymeric material selected from the group consisting of homopolymeric acrylonitrile, copolymers, terpolymers, interpolymers and graft copolymers, containing at least 60% of acrylonitrile and the remainder another polymerizable ethylenically unsaturated monomer, and from 1 to 50 parts by weight of polypyrrolidone, said fiber containing at least 50% acrylonitrile in polymeric form.
13. A synthetic fiber comprising from 50 to 99 parts by weight of homopolymeric acrylonitrile and from 1 to 50 parts by weight of polypyrrolidone.
14. A synthetic fiber comprising from 50 to 99 parts by weight of an acrylonitrile containing polymeric material, said polymeric material containing at least 60% by weight of combined acrylonitrile and the remainder a vinyl ester, and from 1 to 50 parts by weight of polypyrrolidone, said fiber containing at least 50% acrylonitrile in polymeric form.
15. A synthetic fiber of claim 14 wherein the vinyl ester is vinyl acetate.
16. A synthetic fiber of claim 15 containing 10% vinyl acetate.
17. A synthetic fiber comprising from 50 to 99 parts by weight of an acrylonitrile containing polymeric material, said polymeric material containing at least 60% by weight of combined acrylonitrile, and the remainder an acrylic acid ester, and from 1 to 50 parts by weight of polypyrrolidone, said fiber containing at least 50% acrylonitrile in polymeric form.
18. A synthetic fiber of claim 17 wherein the acrylic acid ester is methyl acrylate.
19. A synthetic fiber of claim 17 wherein the acrylic acid ester is methyl methacrylate.

References Cited in the file of this patent

UNITED STATES PATENTS

| | | |
|---|---|---|
| 2,638,463 | Ney et al. | May 12, 1953 |
| 2,711,398 | Barnes et al. | June 21, 1955 |
| 2,734,043 | Crowther | Feb. 7, 1956 |
| 2,790,783 | Coover | Apr. 30, 1957 |
| 2,837,496 | Vandenberg | June 3, 1958 |